No. 897,865. PATENTED SEPT. 8, 1908.
P. D. ARRAS.
PLOW.
APPLICATION FILED JUNE 28, 1907.

3 SHEETS—SHEET 2.

WITNESSES:

Peter D. Arras INVENTOR

By C. A. Snow & Co.

ATTORNEYS

No. 897,865.
PATENTED SEPT. 8, 1908.
P. D. ARRAS.
PLOW.
APPLICATION FILED JUNE 28, 1907.
3 SHEETS—SHEET 3.
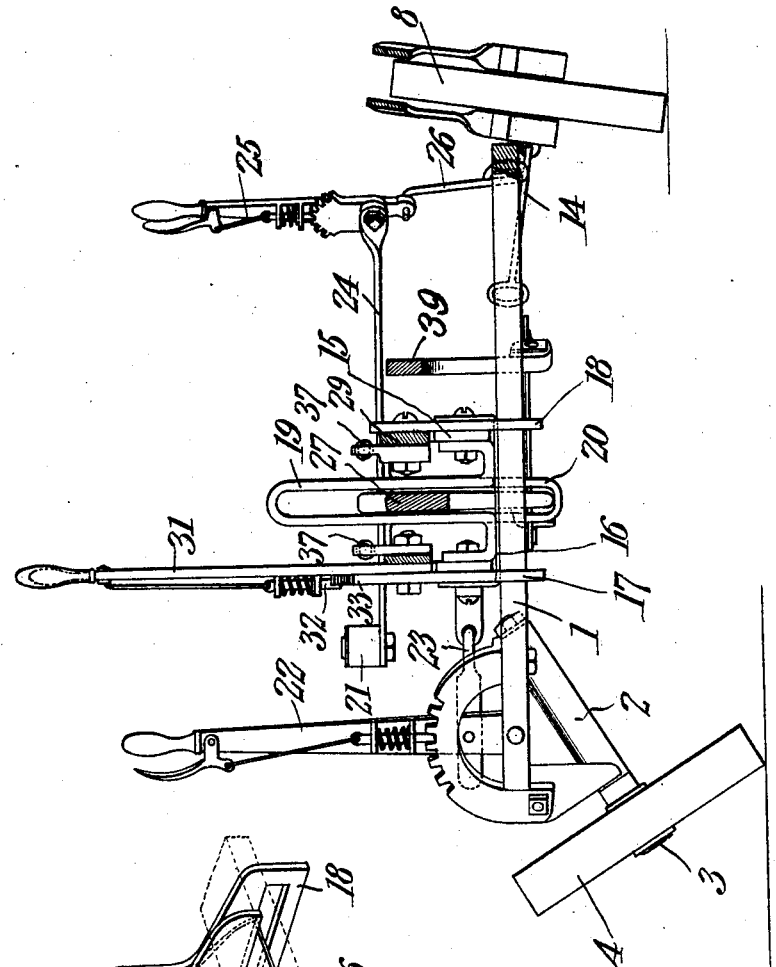
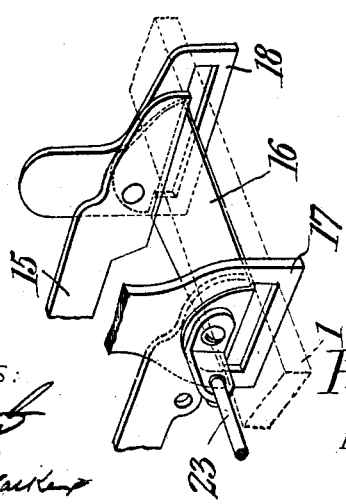
WITNESSES:
PeterD.Arras INVENTOR
By
ATTORNEYS

UNITED STATES PATENT OFFICE.

PETER D. ARRAS, OF RAWSON, OHIO.

PLOW.

No. 897,865.          Specification of Letters Patent.          Patented Sept. 8, 1908.

Application filed June 28, 1907. Serial No. 381,316.

*To all whom it may concern:*

Be it known that I, PETER D. ARRAS, a citizen of the United States, residing at Rawson, in the county of Hancock and State of Ohio, have invented a new and useful Plow, of which the following is a specification.

This invention has relation to plows and it consists in the novel construction and arrangement of its parts as hereinafter shown and described.

The object of the invention is to provide a plow of the sulky type for breaking the ground which may be easily and readily converted from a gang plow into a single share as desired.

The plow consists primarily of a sill which traverses the line of draft at an oblique angle and which is supported at one end by a furrow wheel lying in a plane which traverses the longitudinal axis of the sill at an acute angle and which extends in the same general direction as the line of draft. The opposite end of the sill is supported by a truck and means is provided for adjusting the sill vertically with relation to the truck and resiliently connecting the same. The said truck is mounted upon wheels which are synclined with relation to the furrow wheel. A frame is slidably mounted upon the sill and lever mechanism is provided for adjusting the frame along the sill. The said sill may swing horizontally with relation to the frame whereby its angle with relation to the line of draft may be adjusted. Lever mechanism is provided for swinging the sill. The frame is provided at its front and rear ends with oppositely disposed vertical guides and the beam of a primary plow is located in said guides and lever mechanism is provided for raising or lowering the rear portion of said beam and a foot lever is provided for raising or lowering the forward portion of the said beam. Springs are connected with the said beam and frame and are under tension to assist in elevating the rear portion of the beam. A secondary beam is detachably applied or connected with the primary beam and moved with the same. A clevis bar connects the forward ends of the said beams together. Thus while the said beams move simultaneously with relation to the frame they traverse the sill and may be shifted longitudinally thereof.

Figure 1:
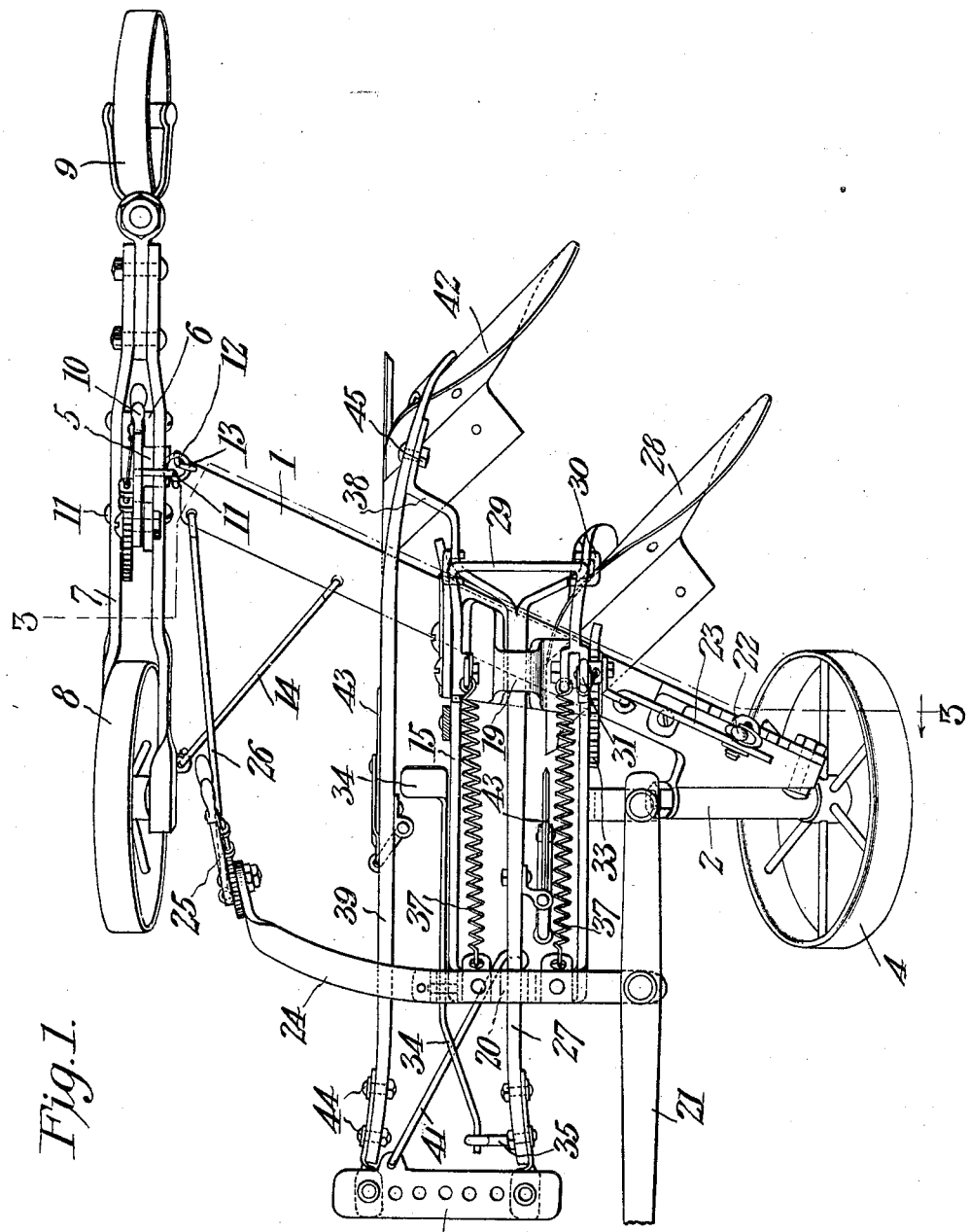
Figure 2:
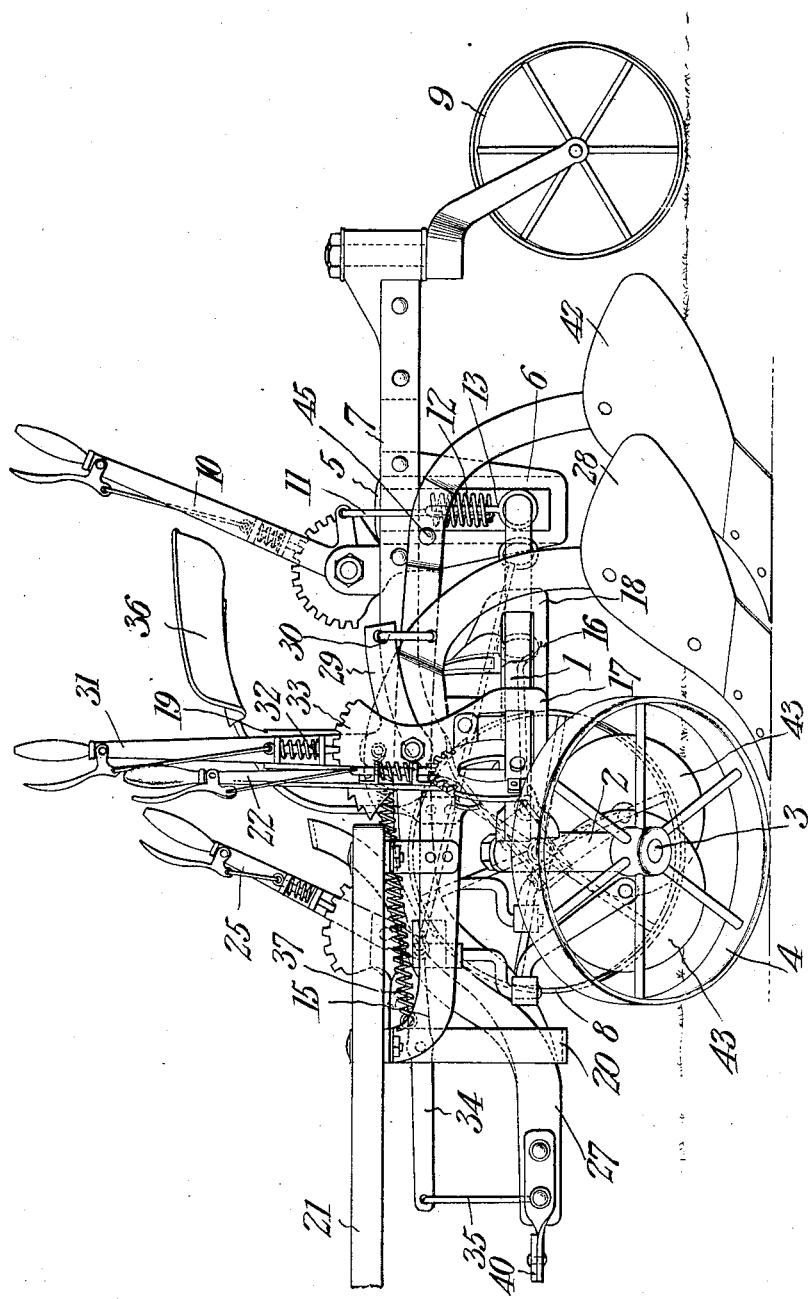

In the accompanying drawings:—Figure 1 is a top plan view of the plow. Fig. 2 is a side elevation of the same. Fig. 3 is a transverse sectional view of the same cut on the line 3—3 of Fig. 1, and Fig. 4 is a detail view of a portion of the frame.

The plow consists of the sill 1 which traverses the line of draft of the implement at an oblique angle. The said sill is provided at one end with the bearing 2. A spindle 3 is journaled for rotation in the said bearing and intersects the sill 1 in vertical and horizontal planes projected through the respective axes of the sill. The furrow wheel 4 is fixed to the end of the spindle 3 and its hub bears against the end of the bearings 2. The other end of the sill 1 is pivoted in the block 5 which is mounted for vertical movement in the guide bracket 6. The said bracket depends from the truck frame 7. The forward end of the frame 7 is supported by a ground wheel 8 which is fixed relative to the frame. The rear end of the frame 7 is supported by a caster wheel 9 which may turn horizontally with relation to the frame. The wheels 8 and 9, when in alinement with each other are synclined with relation to the furrow wheel 4. The ratchet lever 10 is fulcrumed upon the frame 7 and is connected by means of a link 11 with the lower end of a coil spring 12. The link 13 is attached to the sill 1 at its lower end and at its upper end to the upper end of said spring 12. It will thus be seen that as the lever 10 is swung the end of the sill 1 adjacent the truck frame 7 will be raised or lowered through the instrumentality of the links 11 and 13 and the connecting spring 12 and at the same time the said spring affords a resilient support for the said end of the sill 1. As the said end of the said sill is raised or lowered the block 5 is correspondingly elevated or depressed and affords a long bearing between the vertically movable parts and the truck frame. The link 14 is attached at its ends to the forward portion of the frame 7 and the sill 1 respectively and is adapted to hold the said frame at a constant angle with relation to the sill. The frame 15 is mounted upon the sill 1 and traverses the same. The wear plate 16 is interposed between the frame 15 and the sill 1 and is arranged to move with the frame. The eyes 17 and 18 are attached to the opposite sides of the frame 15 and receive the sill 1. The eye 18 is provided with a larger opening to receive the sill 1 than the eye 17 and is located nearer the truck frame 7 than the eye 17. The rear end of the frame 15 is provided with a vertically disposed guide 19 which is located above the sill 1 and the forward end of the frame 15 and is formed into a similar but depending guide 20. The guides 19 and 20 are in alinement with each other although they occupy positions at different levels. The tongue 21 is attached to the side of the frame 15. The lever mechanism 22 is mounted upon the sill 1 and is connected by means of a link 23 with frame 15 whereby the said frame and its attachment may be shifted longitudinally along the sill 1. The forward portion of the frame 15 is provided with a lateral extension 24 upon which is mounted a lever mechanism 25. The link 26 connects the lever 25 with that portion of the sill 1 adjacent the truck frame 7 and affords means for swinging the sill 1 horizontally in the eyes 17 and 18. The primary beam 27 passes through the guides 19 and 20 and traverses the sill 1. The share 28 is attached to the rear end of the beam 27. The yoke 29 is pivoted to the sides of the frame 15 and is connected by means of the links 30 with the rear portion of the beam 27. Said yoke is provided with a lever 31, which in turn is provided with a spring actuated pawl 32 adapted to engage a gear segment 33 fashioned at the upper end of the eye 17. The lever mechanism 31 and its connections afford means for moving the rear portion of the beam 27 vertically up or down.

The foot lever 34 is fulcrumed to the forward end of the frame 15 and is connected by means of a link 35 with the forward end of the beam 27. The power end of the lever 34 is located in the vicinity of the operator's seat 36 and may be manipulated by the foot for raising or lowering the forward end of the beam 27 and changing the pitch of the point of the share 28 in the ground. The springs 37 are attached at their forward ends to the frame 15 and at their rear ends to the yoke 29 and are under tension to assist in elevating the rear portion of the beam 27. The rear portion of the beam 27 is provided with a lateral branch 38 to which may be attached the rear portion of a secondary beam 39. The clevis bar 40 connects the forward ends of the beams 27 and 39 together, and the link 41 lies diagonally with relation to the beam 27 and connects with the same and also with the clevis bar 40. The secondary beam 39 is provided with a plow share 42 and each beam 27 and 39 is provided in advance of its attached share with an adjustable colter wheel 43. When it is desired to use the implement as a gang plow the beam 39 is connected to the beam 27 in the manner as illustrated in Fig. 1 of the drawing. When it is desired to use the implement as a single share plow the beam 39 is removed by removing the bolts 44 and 45.

When the twin beams are used and connected up as described it will be seen that they move simultaneously in every direction and the adjustment of the parts of the implement are uniform with relation to both beams.

Having described my invention what I claim as new and desire to secure by Letters-Patent is:—

1. A plow comprising a wheel supported sill lying obliquely across the line of draft, and a beam lying transversely of the sill and being in the line of draft, and means for adjusting the angle between the sill and beam, whereby the angle between the supporting wheel and the line of draft is adjusted.

2. A plow comprising a wheel supported sill lying obliquely across the line of draft, a beam lying across the sill and being in the line of draft, a frame mounted upon the sill and receiving the beam, a lever mechanism supported by the frame and connected with the sill for adjusting the angle between the beam and the sill.

3. A plow comprising a sill lying obliquely across the line of draft, a beam lying across the sill and being in the line of draft, a wheel supporting one end of the sill, and being fixed with relation thereto, a truck adjustably supporting the opposite end of the sill and wheels carried by the truck and being located upon opposite sides of the sill, said truck retaining the last said wheels against independent vertical movement.

4. A plow comprising a sill, a furrow wheel supporting one end thereof, a truck located at the opposite end and having vertical movement with relation to the sill, wheels attached to the truck and located upon opposite sides of the sill, a lever mechanism mounted upon the truck and means resiliently connecting the sill with the lever mechanism.

5. A plow comprising a frame, a sill supporting the same, and adapted to swing horizontally with relation thereto and a beam guided vertically by the frame and lying across the sill.

6. A plow comprising a sill, a frame located thereon and having at its front and rear sides oppositely disposed fixed guides, a beam located in the guides and crossing the sill, and means for moving the beam vertically in the guides.

In testimony that I claim the foregoing as my own, I have hereto affixed my signature in the presence of two witnesses.

PETER D. ARRAS.

Witnesses:
 FIRM C. BURKET,
 GEORGE WILCH.